United States Patent
Coleman et al.

(10) Patent No.: US 9,319,792 B1
(45) Date of Patent: Apr. 19, 2016

(54) AUDIO CAPTURE AND REMOTE OUTPUT

(71) Applicant: Amazon Technologies, Inc., Reno, NV (US)

(72) Inventors: Ian Coleman, San Francisco, CA (US); Ozgur Cem Sen, Santa Clara, CA (US); Christopher Karl Lang, San Jose, CA (US); Edward James Gayles, Tracy, CA (US)

(73) Assignee: Amazon Technologies, Inc., Reno, NV (US)

( * ) Notice: Subject to any disclaimer, the term of this patent is extended or adjusted under 35 U.S.C. 154(b) by 150 days.

(21) Appl. No.: 14/216,356

(22) Filed: Mar. 17, 2014

(51) Int. Cl.
*H04R 3/12* (2006.01)

(52) U.S. Cl.
CPC .......................................... *H04R 3/12* (2013.01)

(58) Field of Classification Search
USPC ........................................................... 381/80
See application file for complete search history.

(56) References Cited

U.S. PATENT DOCUMENTS

| | | | | |
|---|---|---|---|---|
| 7,434,154 B2 * | 10/2008 | Konetski | ................... | H04N 5/76 348/E5.006 |
| 7,516,078 B2 * | 4/2009 | Dhawan | ............... | H04M 1/7253 379/87 |
| 7,539,551 B2 * | 5/2009 | Komura | ..................... | H04S 1/00 455/3.06 |
| 7,675,943 B2 * | 3/2010 | Mosig | ............... | H04L 29/06027 370/389 |
| 8,170,701 B1 * | 5/2012 | Lu | ........................... | G06F 3/162 700/94 |
| 8,781,613 B1 * | 7/2014 | Tapaninen | ................ | G06F 7/38 700/94 |
| 2003/0071839 A1 * | 4/2003 | Weng | ........................ | H04S 7/40 715/716 |
| 2005/0286546 A1 * | 12/2005 | Bassoli | ................ | G11B 27/002 370/432 |
| 2007/0087686 A1 * | 4/2007 | Holm | ........................ | H04S 7/30 455/3.06 |
| 2008/0077261 A1 * | 3/2008 | Baudino | ................ | H04H 20/63 700/94 |
| 2009/0137319 A1 * | 5/2009 | Lin | ......................... | A63F 13/10 463/42 |
| 2014/0146970 A1 * | 5/2014 | Kim | ........................ | H04R 5/00 381/17 |
| 2014/0172140 A1 * | 6/2014 | Buck | ........................ | H04L 67/10 700/94 |
| 2014/0184516 A1 * | 7/2014 | Kim | ...................... | G06F 3/0231 345/169 |

\* cited by examiner

*Primary Examiner* — Brenda Bernardi
(74) *Attorney, Agent, or Firm* — Seyfarth Shaw LLP; Ilan N. Barzilay (57) ABSTRACT

In a wireless content sharing system, audio may be captured at various levels of a source device, including at an application level. Audio may also be divided into components prior to packetization and transmission, allowing different channels of audio to be sent to different target devices. Audio may be sent with timing information to coordinate playback of content. Audio may be buffered to reduce user noticeable latency.

21 Claims, 8 Drawing Sheets

AUDIO CAPTURE AND REMOTE OUTPUT

BACKGROUND

A wide variety of media devices are available for consumers to use for the consumption of an ever growing selection of content. These media devices may include televisions, tablet computers, personal computers, electronic book readers, gaming consoles, set-top boxes, media players, in-vehicle entertainment systems, portable media players, smartphones, and so forth. The content presented by these media devices may include audio, video, electronic books, games, and so forth. The content may be downloaded or streamed from a content provider to the media device.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices may display audio/visual content for display to a user. These media devices may include televisions, tablet computers, personal computers, electronic book readers, gaming consoles, set-top boxes, media players, in-vehicle entertainment systems, portable media players, tablet computers, smartphones, and so forth. The content may include audio, video, electronic books, games, and so forth. Sometimes a user may wish to take audio/visional content that is generated on one device, such as a mobile phone or tablet, and display that content on another device, such as a large screen television providing a display or home audio video receiver ("AVR") providing sound output. Copying the output of the audio of one device to another device may be referred to as audio sharing or mirroring. In audio sharing, audio data that is generated at one device (called a source device) is sent to another device (called a target device) for playback at the target device. The source device may playback audio at the same time as the target device, resulting in simultaneous audio coming from both the audio and the target. Thus, traditional audio sharing first involves generating a complete audio output (such as an output to be played back at a source device) and sending that complete audio output to a target device.

A number of techniques have been developed to share content between devices wirelessly without the use of a cord or other physical connector. Miracast is one protocol that enables content sharing between devices. Bluetooth may also enable content sharing, such as audio sharing. For example, a Bluetooth enabled speaker may receive audio data over a wireless Bluetooth connection for playback on a remote target speaker, possibly along with simultaneous playback from a source device or other remote target speaker. Traditional audio sharing techniques typically focus on true "mirroring", that is taking the audio output of one device, compressing it, and sending it another device, without regard to application level interactions or splitting the audio signal into discrete components. This focus suffers from a number of drawbacks, including a lack of flexibility when it may be desirable to split the audio signal for sending to different devices based on application level processing and/or user preferences, loss of quality due to compression/encoding, and latency issues. Latency includes delays such as transmission delays, processing delays, etc. that may occur between transmission of audio data by a source device and eventual output of audio by the target device.

Offered is an improved audio sharing system and method. Instead of transmitting the processed audio data of a source device to be mimicked on a target device (which simply copies the audio data from the source media device and sends it to the target media device for playback), the source device may transmit lower level audio data or audio instructions/commands to the target device. The audio may be captured as the output of a specific application operating on the source device, thus allowing audio captured from different applications of the source device to be sent to different target devices. The audio may also be captured at an even lower level, such as at the level of an audio driver, just before output, or prior to mixing. In this manner different kinds of audio data may be captured by a source device and sent to a target.

The target device, also called a remote audio output device, may be a device wirelessly connected to the source device that includes audio output components, such as one or more speakers. The remote audio output device may include processing components to receive and playback audio data received from a source device, such as a mobile phone, tablet, or other mobile device. Audio data from a source device may be sent to one or more remote audio output devices for coordinated playback.

The audio data may be divided into audio component data segments, where individual data segments each correspond to different portions of audio that are to be played together. For example, the audio of the source device may be split into channels, where an audio channel represents an audio source corresponding to a different direction or frequency of a combined audio system. For example, audio may be divided into channels such as a left audio signal and right audio signal (for stereo applications), into different location based audio channels (for example in a 5:1 or 7:1 audio configuration) or otherwise divided. The different audio signal components may be sent to and/or output by different target devices in different segments, called audio component data segments. For example, for a 5:1 audio system, for a time period of audio to be output, an individual audio component data segment may be created for each channel of the audio system. Thus, for time period X, six audio component data segments may be created (the six segments representing the six channels of audio for a 5:1 system for the audio of time period X). Each audio component data segment may be sent to a different remote audio output device (such as a remote speaker) for playback, where the six audio component data segments for time period X are played back at the same time across one or more devices.

In another example, the audio component data segments may be grouped when being sent to devices. For example, audio component data segments corresponding to the left front, right front, left rear, and right rear channels may be send to a surround sound system remote audio output device while the audio component data segment corresponding to the subwoofer channel may be sent to a different subwoofer remote audio output device. In the above example, the audio component data segment corresponding to the center channel may be played back by the mobile device, which may be the device closest to the user.

As illustrated above, audio data in the individual audio component data segments may be divided by channel, but they may be divided in other ways as well. For example, high frequency audio data may be included in an audio component data segment intended for a tweeter remote audio output device whereas low frequency audio data may be included in an audio component data segment intended for a woofer remote audio output device. In another example, certain audio effects (echo, special effects, etc.) may be included in their own audio component data segments for transmission and eventual playback by different remote audio output devices. In certain configurations audio component data segments may include exclusive audio data, while in other configurations audio component data may include certain overlapping audio data. Other configurations and arrangements of audio component data segments and target remote audio output devices are possible.

The audio data may also be sent separately from other data (such as video data) that is to be played back at the same time as the audio data. This allows the audio data to be sent on its own, in communications that may be out-of-band from resource intensive video data. This technique, combined with the use of WiFi and other high bandwidth technologies may allow the audio data, under certain conditions, to be sent without encoding. Thus the present system may offer improved audio quality from transmission schemes such as Bluetooth, Miracast, etc. that call for compressed audio. The present system also allows for reduced latency by configuring transmission to target media devices based on communication conditions.

Further, audio data may also be associated with certain timing information to coordinate playback among media devices, to coordinate playback among audio data component segments, or with other content, such as video. The timing information may include a playback time during which particular segments are to be played back. Such a playback time may include a start time and/or end time for a particular audio data component segment. Media devices may also exchange network condition information, such as latency information, to coordinate playback among media devices of an audio sharing system.

Figure 1A:
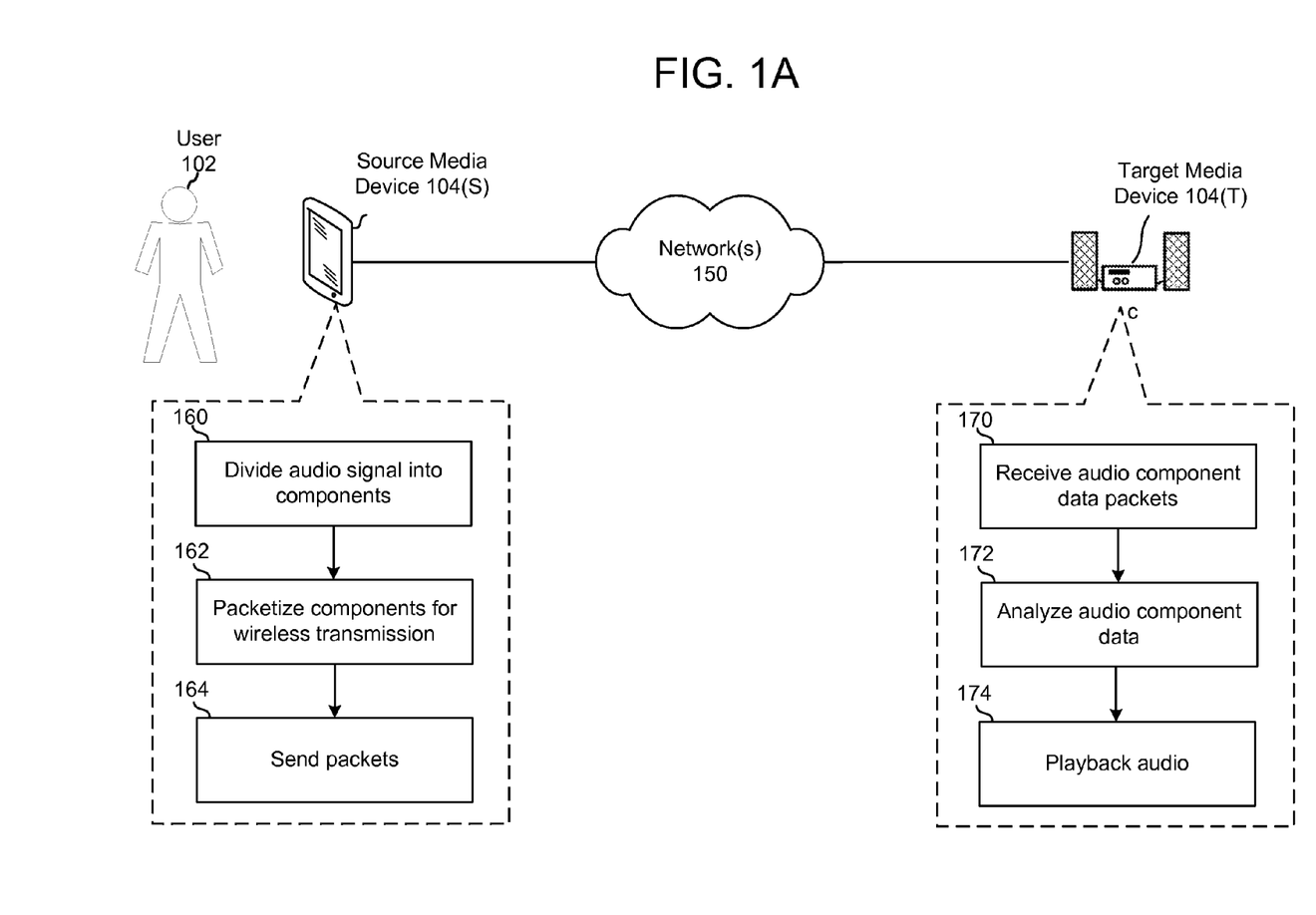
FIG. 1A is an illustrative system of a multiple media device system in which audio data is generated on one media device and played back on another.

FIG. 1A illustrates audio sharing according to one aspect of the present disclosure. A user 102 operates a source media device 104(S). After a connection and initialization process, described in more detail below, the source media device 104(S) connects over a network 150 to a target media device 104(T). The source media device 104(S) divides an audio signal into components, as shown in block 160. The audio signal may be output from an application and may be divided into components by the application itself (for example by an application that outputs audio in 7:1 multi-channel format) or may be divided into audio component data segments by some downstream process running on the source media device 104(S). The audio component data segments may then be packetized for wireless transmission, as shown in block 162. The packets of audio component data segments may then be sent to one or more target media devices 104(T) across the network 150, as shown in block 164. The audio component data segments may include timing information. The target media device 104(T) receives the audio component data, as shown in block 170. The target media device 104(T) then analyzes the audio component data for playback, as shown in block 172. The analysis may include determining which audio component data should be played back on what speaker, at what time, etc. The audio component data is then played back by the target media device 104(T), as shown in block 174. By exchanging audio data in the manner described herein, wireless audio sharing may be improved.

Described below is a system of media devices that may be configured to share audio data using the offered methods.

Each media device may include a communication module. The communication module is configured to discover other media devices and the services they support and provide a framework for establishing and using connections with the other media devices. The connections may be authenticated, encrypted, and so forth.

The communication module may be configured to operate in conjunction with a content direct sharing module which sends a media stream to a receiving media device. For example, the content direct sharing module uses connections maintained by the communication module to send audio and video data from a tablet computer to a television for display and audio playback.

The connection module may be implemented as a software stack executing on the media devices in the system. The connection module on a first media device may differ from the connection module on a second media device. For example, the first media device may include a transport module configured to provide secure sockets over Internet Protocol while the second media device may not. The media devices may include the content direct sharing module, the device controller module, or both.

By providing the communication module, the content direct sharing module, and the device controller module on media devices, the system enhances the user experience. Media devices entering the environment with their associated services may be readily added or removed, and content may be easily shared among those media devices.

Figure 1B:
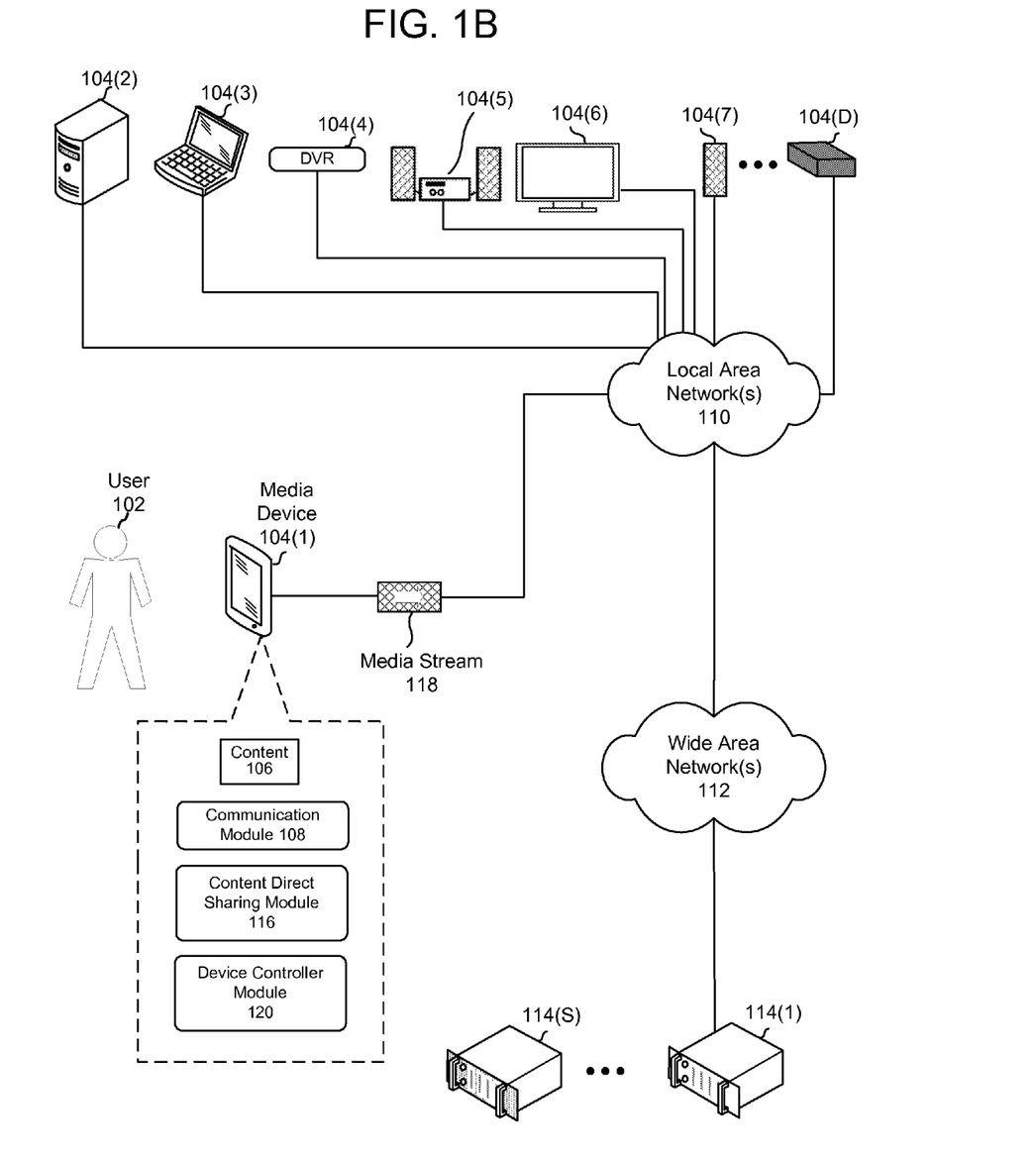
FIG. 1B is an illustrative system of a multiple media device system in which audio data is generated on one media device and played back on another.

FIG. 1B is an illustrative system 100 for providing a multiple media device infrastructure in which various services of the media devices may be discovered and shared. As used in this disclosure, services are modules or groups of instructions which, when executed by a processor, provide a particular set of functionalities. For example, a video streaming service may be configured to participate in a streaming session with a content provider and output video suitable for presentation on a display.

A user 102 is depicted with several media devices 104(1), 104(2), . . . , 104(D). While a single user 102 is shown, more than one user 102 may be present. The media devices 104 are configured to present, store, manipulate, or otherwise participate in the consumption of content 106. The media devices 104 may include televisions, tablet computers, personal computers, electronic book readers, gaming consoles, set-top boxes, media players, in-vehicle entertainment systems, portable media players, smartphones, individual audio speakers, and so forth.

The media devices 104 may execute one or more services. These services may be configured to interact with the content 106 by receiving and processing the content 106 for presentation, generating a stream of content for presentation, providing various functionality, and so forth. The content 106 may include audio, video, electronic books, games, and so forth. The media devices 104 are discussed below in more detail with regard to FIG. 2.

The media devices 104 include a communication module 108. The communications module 108 is configured to support a framework within which availability of different services on different media devices 104 may be distributed and connections between those media devices 104 may be established. These connections may be used to send, receive, control, or otherwise interact with the content 106. The communication module 108 is discussed in more detail below with regard to FIG. 3.

These connections maintained by the communication module 108 may use one or more networks. For example, the network(s) 150 illustrated in FIG. 1A may include local area networks ("LANs") 110 and wide area networks ("WANs") 112 as illustrated in FIG. 1B. The LANs 110 may be supported using an access point topology, ad-hoc peer to peer topology, and so forth. The LANs may be wired, wireless, or a combination. The LANs 110 may be implemented using Ethernet, Wi-Fi, Bluetooth, ZigBee, and so forth. Within the system 100, several different LANs 110 may coexist. For example, media device 104(1) and 104(6) may be connected to one another using Wi-Fi, while the media device 104(2) and 104(5) may be interconnected using Bluetooth. The connections may be between media devices 104 which are on the same or different local area networks 110.

The LAN(s) 110 may connect to one or more WANs 112. The WAN 112 may include one or more public networks such as the Internet, private networks, cellular data networks, or a combination thereof. The WAN 112 may in turn couple to one or more servers 114(1), 114(2), . . . , 114(S). The servers 114 may exchange information with the one or more media devices 104. While the servers 114 are depicted as single servers, in some implementations the servers 114 or the functions attributed to the servers 114 may be provided by a plurality of devices. For example, the server 114 may be implemented as a virtualized server executing across a plurality of physical servers.

In one implementation the server 114 or another device coupled to the WAN 112 may provide a proxy service to transfer information from a media device 104(1) to another media device 104(2) using the WAN 112. These media devices 104 may be on the same or different LANs. In another implementation the media devices 104 on different LANs 110 may establish connections with one another over the WAN 112 without using the proxy service.

The media device 104 may include other modules such as a content direct sharing module 116. The content direct sharing module 116 provides a media stream 118 from a first media device 104 to a second media device 104. Certain media devices may be configured differently from other media devices. For example, as illustrated here a tablet computer media device 104(1) may be configured to receive content 106 which may be protected using one or more digital rights management ("DRM") schemes, while the television media device 104(6) may not be configured in this manner. A content direct sharing module 116 executes on both the tablet media device 104(1) and the television media device 104(6). The content direct sharing module 116(1) of the media device 104(1) generates a media stream 118 which is sent, using the LAN 110, to the media device 104(6) which presents at least a portion of the media stream 118. In one aspect, the media stream 118 may include coded content 106 on the source media device 104. In another aspect, the media stream 118 may include audio component data to be played back by one or more target media devices.

In some implementations the content direct sharing module 116 which is receiving the media stream 118 may be disallowed from storing the media stream in permanent or semi-permanent memory. For example, the content direct sharing module 116 may be configured to store no more than 300 frames of media stream 118 data at any given time and may also be configured to display received frames in a streaming manner. The content direct sharing module 116 may also be configured to establish a secured pathway to the display of the media device 104 executing the content direct sharing module 116, to reduce the likelihood of interception of the media stream 118 by other applications or services executing on the media device 104.

The content direct sharing module 116 may include modules such as a virtual screen module, a virtual audio device module, or both. The virtual screen module may be configured to acquire graphical command data which is designated for presentation on the display of the media device 104. The virtual screen module may also be configured to receive graphical command data, such as the media stream 118 from another media device 104 and send that graphical command data to a processor of the media device for rendering and display on a display of the media device 104. This communication may be facilitated by the communication module 108. The virtual audio device module may be configured to acquire audio data which is designated for presentation on speakers of the media device 104. The virtual audio device module may be configured to send audio data in the form of audio component data segments as described below. Likewise, the virtual audio device module may be configured to receive audio data, such as audio component data segments from the media stream 118 and present that audio data on the speakers of the media device 104.

The content direct sharing module 116 may be configured to send media streams 118 to multiple media devices 104, either as a multicast or as separate streams. For example, the media device 104(1) may provide the media stream 118 comprising audio data to the media devices 104(5) and 104(6) for playback using a multicast configuration. In another example, the media device 104(1) may provide a first media stream 118(1) comprising audio to the media device 104(5) and a second media stream 118(2) comprising video and audio to the media device 104(6).

The content direct sharing module 116 may be configured to mirror presentation of content 106, or provide different information to different media devices 104. In one implementation first content 106 may be presented on the media device 104 providing content direct sharing while different second content is sent to another media device 104. Continuing the example, the media device 104(1) may present a user interface for controlling presentation of the content 106, while a media stream 118(1) comprising video is sent to the media device 104(6) for presentation on a display and a media stream 118(2) comprising audio is sent to the media device 104(5) (an AVR) or 104(7) (an individual speaker) for presentation by one or more speakers.

The media device 104 may also include a device controller module 120. The device controller module 120 may be configured to generate media presentation data. In one aspect, the media presentation data may include an address and content identifier, which when processed by the receiving media device, initiates a transfer from a server 114(1) to the receiving media device over the LAN 110 and/or WAN 112. The address and content identifier may include, for example, a uniform resource locator ("URL") which directs the target media device to content on the server for retrieval and display/playback on the target media device. Content may be shared from the server 114 to a media device 104 through the transmission of graphical commands as described below.

Figure 2:
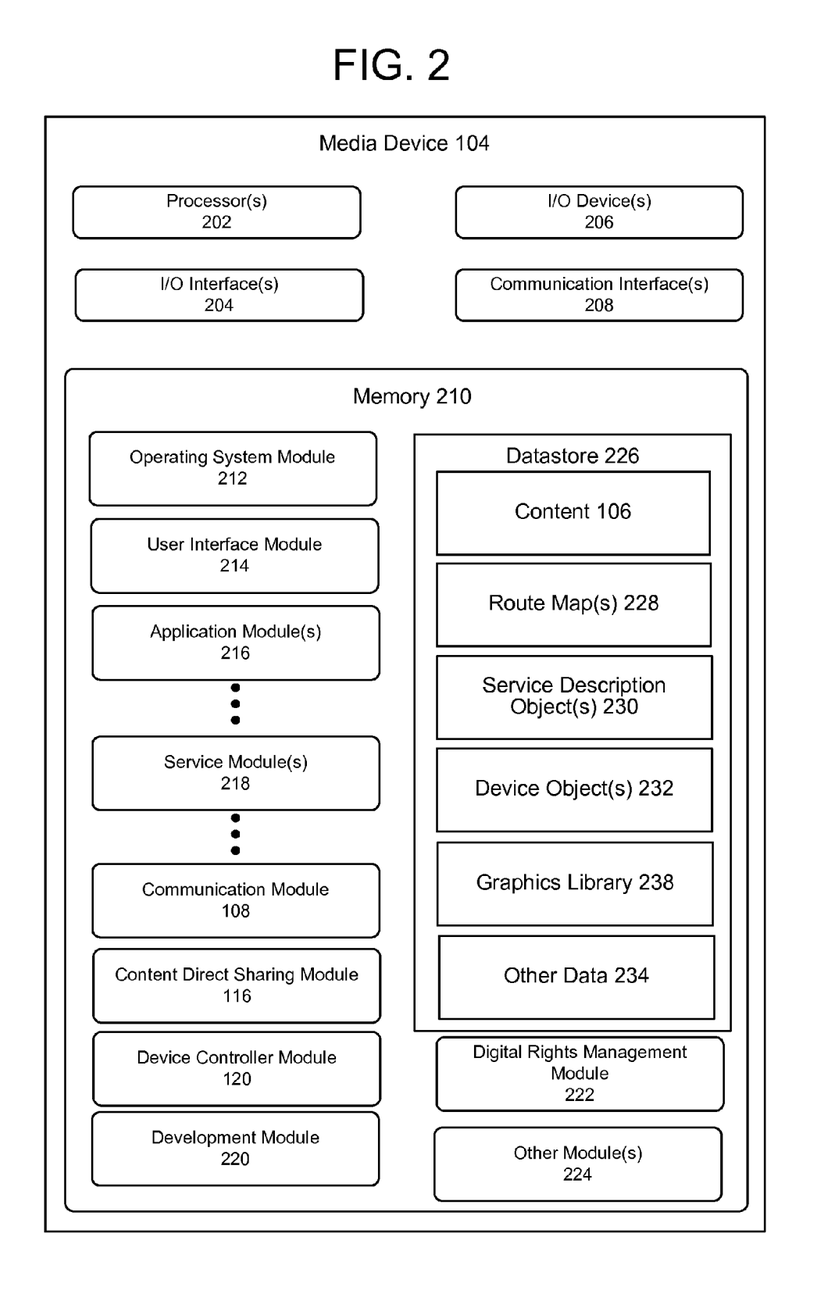
FIG. 2 illustrates a block diagram of a media device configured to support the multiple media device system.

FIG. 2 illustrates a block diagram 200 of the media device 104 configured to support the multiple media device infrastructure. The media device 104 may include one or more processors 202 configured to execute one or more stored instructions. The processors 202 may comprise one or more cores. The media device 104 may include one or more input/output ("I/O") interface(s) 204 to allow the processor 202 or other portions of the media device 104 to communicate with other devices. The I/O interfaces 204 may comprise inter-integrated circuit ("I2C"), serial peripheral interface bus ("SPI"), Universal Serial Bus ("USB") as promulgated by the USB Implementers Forum, RS-232, one or more media device interfaces such as High Definition Multimedia Interface ("HDMI") as promulgated by HDMI Licensing LLC, TOSLINK as promulgated by Toshiba Corp., analog video, analog audio, IEEE 1394 as promulgated by the Institute for Electrical and Electronics Engineers, and so forth.

The I/O interface(s) 204 may couple to one or more I/O devices 206. The I/O devices 206 may include input devices such as one or more of a camera, a microphone, a touch sensor, a button, and so forth. The I/O devices 206 may also include output devices such as one or more of a display, audio speakers, haptic output device and so forth. In some embodiments, the I/O devices 206 may be physically incorporated with the media device 104 or may be externally placed.

The media device 104 may also include one or more communication interfaces 208. The communication interfaces 208 are configured to provide communications between the media device 104 and other devices, such as other media devices 104, routers, access points, the servers 114, and so forth. The communication interfaces 208 may include personal area networks, wired and wireless local area networks ("LANs") 110, wide area networks ("WANs") 112, and so forth. For example, Ethernet, Wi-Fi, Bluetooth, ZigBee, and so forth.

The media device 104 may also include one or more busses or other internal communications hardware or software that allow for the transfer of data between the various modules and components of the media device 104. The media device 104 may also include other components such as an audio mixer, or other specialized components, such as processor(s), etc. for operating on audio data.

As shown in FIG. 2, the media device 104 includes one or more memories 210. The memory 210 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 210 provides storage of computer readable instructions, data structures, program modules and other data for the operation of the media device 104.

The memory 210 may include at least one operating system (OS) module 212. The OS module 212 is configured to manage hardware resource devices such as the I/O interfaces 204, the I/O devices 206, the communication interfaces 208, and provide various services to applications or modules executing on the processors 202. Also stored in the memory 210 may be one or more of the following modules. These modules may be executed as foreground applications, background tasks, daemons, and so forth.

A user interface module 214 is configured to provide a user interface to the user 102 using the I/O devices 206 and accept inputs received from the I/O devices 206. The user interface may include one or more visual, audible, or haptic elements. For example, the user interface may be configured to provide a graphic user interface, an audible user interface, and so forth.

One or more application modules 216 may be stored in the memory 210. The one or more application modules 216 provide functionality which interacts with the user 102. For example, an application module 216 may be a game which is playable by the user.

One or more service modules 218 may be stored in the memory 210. The service modules 218 provide one or more services comprising one or more data processing functionalities to other service modules 218, application modules 216, or other modules. The one or more functionalities may be associated with presentation of the content 106 on one of the media devices 104. For example, the service modules 218 may be configured to stream audio or video from a server for presentation, transfer and present images, transfer files, and so forth. Other service modules 218 may provide functionality such authentication to confirm information such as the ownership or affiliation of a particular media device 104.

As described above, the communication module 108 is configured to establish and support communications between the media device 104 other media devices 104, servers 114, and other devices. The communication module 108 may provide an abstraction to allow the application modules 216, service modules 218, and so forth to readily interact with corresponding modules on other media devices 104. The communication module 108 may access the communication interfaces 208 to exchange information between the devices. The communication module 108 is discussed in more detail below with regard to FIG. 3.

As described above, the content direct sharing module 116 provides a media stream 118 from a first media device 104 to a second media device 104. In one implementation the content direct sharing module 116 may provide for concurrent presentation/playback between the first media device 104 and the second or more media devices 104. In another implementation, the content direct sharing module 116 may suppress or discontinue presentation on the first media device 104 while presentation continues on the second or more media devices 104. For example, a media presentation application module 216 on the tablet media device 104(1) may be receiving a stream of a song. The content direct sharing module 116 may request from the communication module 108 connections to the AVR 104(5) and solitary speaker 104(7) (which may be proximate to the AVR, such as a supplemental speaker for playback of a different channel of audio, or may be separate from the AVR, such as a speaker in a different room). The communication module 108 may establish these connections and the song may be played back simultaneously on devices 104(5) and 104(7), while a user interface allowing for control of the media presentation application module 216 may remain on the tablet media device 104(1) to facilitate the user's 102 control of the song playback. The audio data comprising the song may be stored and streamed from one of the media devices 104 (such as the tablet media device 104(1)) or may be stored at another location, such as a server 114, or other location.

A development module 220 may be stored in the memory 210 of the media device 104. The development module 220 may include various libraries, modules, functions, and so forth such as may be present in a software development kit or other toolset. The development module 220 may implement functions such as "default service implementation" in which an initial set of basic service housekeeping issues are defined. The development module 220 may also implement a "transport manager" configured to select and manage particular transport modules for use based on parameters such as access level associated with the service, what transport module the service was discovered over, and so forth. The transport modules are discussed in more detail below with regard to FIG. 3.

A digital rights management module 222 may provide support for presenting or processing content 106 which is protected using one or more digital rights management schemes. Other modules 224 may also be present. For example, a speech recognition module may be present and used to accept spoken input from the user 102 as received from a microphone I/O device 206.

The memory 210 may also include a datastore 226 to store information. The datastore 226 may use a flat file, database, linked list, tree, or other data structure to store the information. In some implementations, the datastore 226 or a portion of the datastore 226 may be distributed across one or more other devices including servers, network attached storage devices and so forth.

The datastore 226 may store content 106, either in its entirety or a portion. One or more route maps 228 may be stored. The route maps 228 provide information about services on other media devices 104 and the routing to access those services.

Service description objects ("SDO") 230 may be stored. The SDO 230 provides information such as service identifiers, access information, encryption information, and so forth, associated with a particular service as provided by a service module 218. The service identifiers may be used to indicate a particular service which is available. The access information may include details on account names, passwords, supported transports, and so forth. The encryption information may include data such as encryption keys, protocols, and so forth.

Device objects ("DOs") 232 may also be stored in the memory 210. These may include a service description array indicating available services local to a particular media device 104, universally unique identifier ("UUID") associated with the particular media device 104, friendly name for the particular media device 104, transport information, and so forth. Transport modules and the associated information are discussed below with regard to FIG. 3.

The memory 210 may also store one or more graphics libraries 238. The graphics libraries may include data used by a processor 202, such as a graphics processor to render images for display.

Other data 234 may also be stored. For example, the other data 234 may include user preferences, configuration files, and so forth.

Figure 3:
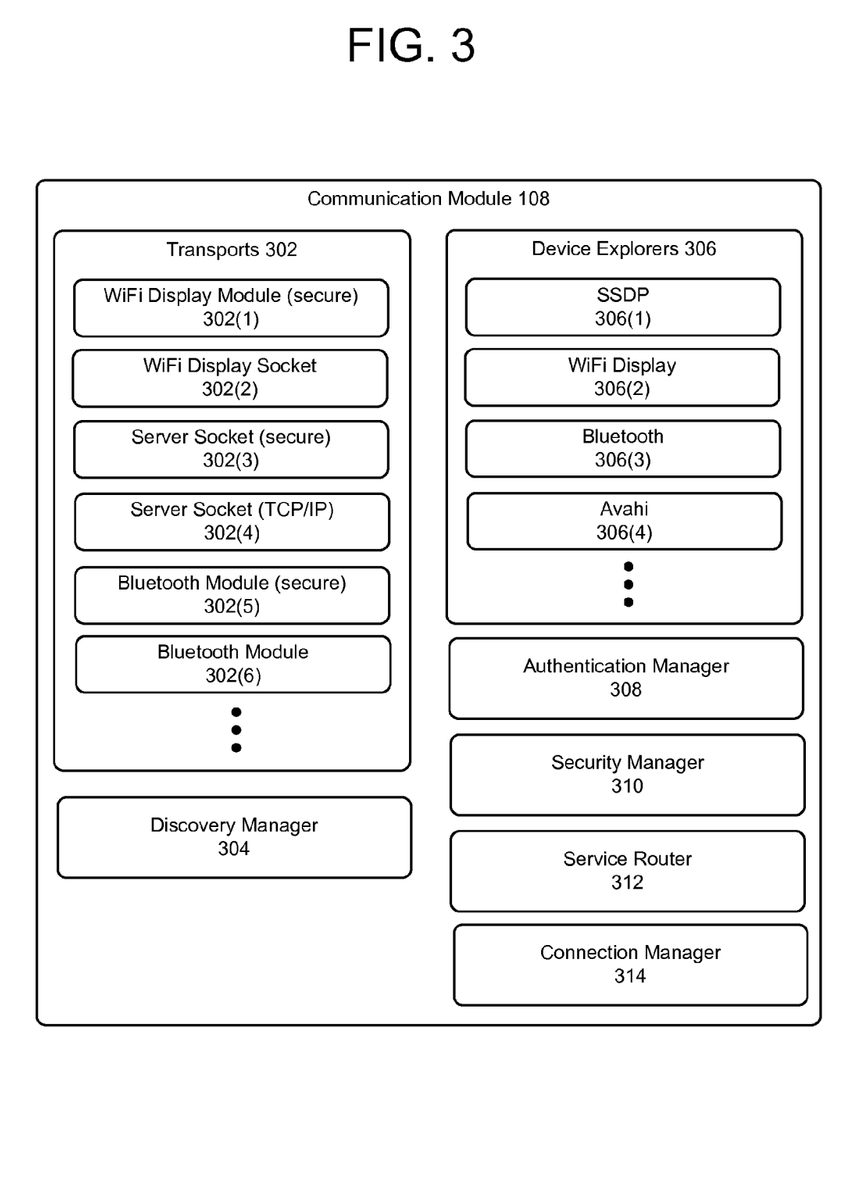
FIG. 3 illustrates a block diagram of a communication module configured to support the multiple media device system.

FIG. 3 illustrates a block diagram 300 of the communication module 108 configured to support the multiple media device infrastructure. In some implementation the communication module 108 and the subordinate modules may be implemented as a background process. The communication module 108 may include modules including one or more transport modules 302, a discovery manager 304, one or more device explorers 306, an authentication manager 308, a security manager 310, a service registrar 312, a connection manager 314, and so forth.

The transport modules 302 are configured to provide functionality at a transport layer and establish and maintain communication channels that transfer bits from one media device 104 to another device. In one implementation the transport modules 302 may operate at layer 4 of the Open Systems Interconnection ("OSI") model. The media device 104 may have multiple transport modules 302 available contemporaneously.

The communication module 108 provides a simplified abstraction to the application modules 216, service modules 218, and other modules. A module requiring communication services may use this simplified abstraction to readily initiate communication, without the module knowing the details of the particular transport module and type of connection involved. For example, a requesting service module 218(1) on the media device 104(1) may initiate a request to communicate with the corresponding service module 218(2) on the media device 104(5). This communication may use one or more of several different transport modules 302, but this complexity may be hidden from the requesting service module 218(1) and from the receiving service module 218(2).

Due to the modular nature of the communication module 108, additional transport modules 302 may be easily added without requiring re-engineering of the communication module 108. For example, a transport module 302 supporting an infrared optical transport mechanism may be added without disrupting other existing transport modules 302 or other operational aspects of the communication module 108.

The transport modules 302 may include a secured Wi-Fi Display module 302(1) and a Wi-Fi Display socket 302(2). These transport modules 302(1)-(2) may be compliant with the Miracast standard promulgated by the Wi-Fi Alliance, the Intel Wireless Display ("WiDi") standard developed by Intel Corporation, or both. The Wi-Fi Display transport module allows for peer-to-peer exchange of media information. This exchange may be encrypted in the case of the secured transport, or unencrypted in the case of the unsecured transport. The transport modules 302 may include transport modules configured for the exchange of graphical data and instructions, as described below.

Transport modules 302 which are based on Internet Protocol ("IP") server sockets may be provided, such as a secure server socket 302(3) and an unsecure server socket 302(4). These transport modules 302(3)-(4) may support wired or wireless communication.

Transport modules 302 may also support the Bluetooth standard as promulgated by the Bluetooth Special Interest Group. A Bluetooth module which is secured 302(5) may be provided, as well as a Bluetooth module 302(6) which is unsecured.

Other transport modules 302 may also be provided. For example, a transport module may provide transport functionality over a wireless WAN, such as LTE, 3G, 4G, and so forth. The transport modules 302 may implement a portion of the standard, specification, or protocol. For example, the transport modules associated with Bluetooth may omit application level functions in the Bluetooth specification, such as profiles.

A discovery manager 304 manages the device explorers 306. The discovery manager 304 provides an interface which abstracts the mechanism provided by the device explorers 306 to search for media devices 104 and discover the services associated with those media devices. The discovery manager 304 provides to other modules the results of the discovery, while concealing from other modules consuming these results the complexity of the search and discovery processes which may differ from transport module 302 to transport module 302.

The device explorers 306 are modules which are configured to gather device object 232 data using one or more of the transport modules 302. The device explorers 306 may process the device objects 232 to generate one or more route maps 228. The device explorers 306 may also be configured to respond to the device explorers 306 on other devices to distribute device objects 232, route maps 228, or other information.

The device explorers 306 may operate in "active" or "passive" modes. The active mode requires some interaction, such as user 102 approval, before a service is advertised as being available. The active mode may be time limited, such that the associated service is only discoverable for a particular period, so long as the user 102 is activating a particular command or button, and so forth. For example, the service module 218 providing output for the tablet media device 104(1) may be placed in active mode, such that the display and speakers of that media device 104(1) are only discoverable when the user 102 explicitly makes them so.

In comparison, the device explorers 306 may operate in a passive mode. In the passive mode, the service modules 218 are available without user interaction. For example, the AVR media device 104(5) and the television media device 104(6) may be configured to operate in passive mode such that any of the media devices 104 in the system 100 may see the resources they have available to share.

Depicted here are device explorers 306 including for simple service discovery protocol ("SSDP") 306(1), Wi-Fi Display 306(2), Bluetooth 306(3), Avahi 306(4), and so forth. The SSDP 306(1) allows for advertisement and discovery of services over an IP-based network using user datagram protocol ("UDP") packets for transfer using one or more of the transport modules 302. The Avahi explorer 306(4) may implement a version of Avahi as developed by Lennart Poettering and others. Avahi provides a zero configuration protocol using least a portion of the multicast domain name service ("DNS"), DNS-based service discovery ("DNS-SD"), or both to discover and configure an IP-based network without user intervention.

The authentication manager 308 is configured to authenticate the media devices 104 in the system 100 and authorize communications with one or more of those media devices 104. This authentication may be accomplished within the LAN 110, or may involve external resources such as the servers 114. In one implementation, the authentication may involve parsing a device identifier received from another media device 104 to determine a manufacturer or model number. Previously determined devices 104 may then be allowed to communicate. In another implementation, a first media device 104 may interrogate the server 114 to authenticate a second media device 104. For example, the tablet media device 104(1) may discover the presence of the television media device 104(6). Continuing the example, the tablet media device 104(1) may send data about the television media device 104(6) to the server 114, to confirm that connectivity is permitted. The authentication manager 308 may manage this exchange.

In some implementations the authentication manager 308, or another module, may be configured to authenticate the identity of the user 102. In one implementation, access levels to services available on the LAN 110 may be based at least in part on user identity. For example, the user 102(1) who lives in a home environment where the system 100 is implemented may have "family" access when using the device of another user 102(1) in that environment.

A security manager 310 is configured to manage use of encryption and other techniques to prevent unauthorized use of the media device 104. For example, the security manager 310 may be configured to require a predetermined encryption for administrative access to the communication module 108.

The security manager 310 may work in conjunction with the authentication manager 308 to manage authentication tokens granted to other media devices 104. The security manager 310 may permit different access levels. These different access levels permit connectivity and operation with different restrictions.

In one implementation, the access levels may include levels such as "family," "friend," "first party devices," and "guest." The family level allows connections only from another media device 104 which is registered or otherwise associated with a common account. The friend level allows access to a specifically "trusted" media device 104. The first party device level indicates that the media device 104 shares a common manufacturer, distributor, or other attributes. The guest level is similar to friend level access, but has a limited duration in time. For example, the media device 104 may be considered a friend device when on the same LAN 110. Particular service modules 218 may define the access levels they will operate with.

The service router 312 is configured to process incoming connections. The service router 312 may route the connection to the authentication manager 308 for processing. Once authenticated and authorized, the service router 312 may direct the traffic to the appropriate service module 218.

The connection manager 314 manages the active connections in the media device 104. The user interface module 214 may be configured to present to the user 102 various prompts or information, such as whether to permit a particular connection, whether to seek out a particular connection, and so forth.

When one or more media devices desire to exchange content (either as a source device or as a target device), they may enter a discover mode where each device makes its presence known to other devices. In this manner a source device may detect a target device and vice-versa. A communication connection may then be established between the source device and target device. The communication connection may be established through the exchange of messages including instructions to connect the devices for purposes of exchanging information, such as audio data. Audio data may include audio component data segments as described below. Following the establishment of a communication connection, the devices may exchange initialization information and beginning an audio sharing session. An audio sharing session is a session during which audio data are sent from the source media device to the target media device.

Devices that wish to connect to each other after device discovery may engage in a handshake and connection setup that may be controlled by various components discussed above with regard to FIGS. 2 and 3. As part of device discovery or connection setup between two or more devices, a device may advertise its capabilities, including available services, communication protocols and constraints, hardware capabilities, operating OS, and the like. Following detection, two or more media devices may connect and form a network for exchanging content and other information. The network may make use of multiple platforms (such as WiFi, Bluetooth, LTE, etc.) to communicate and is not necessarily limited to a specific platform, or even to one platform. The devices may determine among themselves the best platform to use to exchange data using the various components and operations described here.

When a source media device connects to a target media device for purposes of audio sharing, an initialization process may be executed by the devices. The initialization process may occur prior to establishing an audio display sharing session where audio data is sent from the source media device to the target media device. During this initialization process various information such as configuration information may be exchanged between the source media device and target media device. Configuration information may include information regarding settings, capabilities, or other configurations of the respective devices. For example, configuration information may include detailed information regarding audio output devices available to each media device (such as speaker/channel configuration, number and placement of speakers, whether headphones are being used, speaker/headphone capabilities, model numbers, etc.), communication configuration data (such as available communication platforms and communication conditions like latency between devices, latency between a device and audio speaker, error rates, compression settings, etc.), timing information (such as clock settings, timing synchronization information, etc.), preferred formats for receiving data, operating system and other computing capability information, etc. Other types of configuration information may also be exchanged.

Such configuration information, or other information, may continue to be exchanged between media devices as out-of-band exchanges over a back channel separate from any audio sharing sessions while the source media device and target media device remain capable of communicating with each other. For example, a target media device and source media device may regularly exchange information regarding network communication conditions, latency, etc. Further, additional data that may be needed by the target media device to properly playback audio content may also be sent by the source in-band during an audio sharing session as needed. Such data may be sent as part of an audio sharing communications, during lulls in audio sharing communications, or otherwise.

A source media device desires may start an audio sharing session with a target media device by sending an audio sharing session initiation instruction to the target media device. The target media device may acknowledge the instruction and the devices may exchange session information. The session information may include any initialization or configuration information that had not yet already been exchanged as well as information regarding how the source media device and target media device will exchange audio data during the session such as information regarding the source of the audio to be sent (such as the app, encoding information, number of channels, associated content such as other video or audio, etc.), information regarding the target media device capabilities (available audio outputs at the target), connection specifics (error rate, throughput, channel conditions, latency) or other information. Once the session has started the source media device sends the processed packetized audio component data segments to the target media device along with associated metadata such as timestamps, audio commands, etc. The target media device receives the packetized audio data, depacketizes it, decodes it (or performs other operations to make the data operable) and plays the audio back on the appropriate speaker at the appropriate time.

Figure 4:
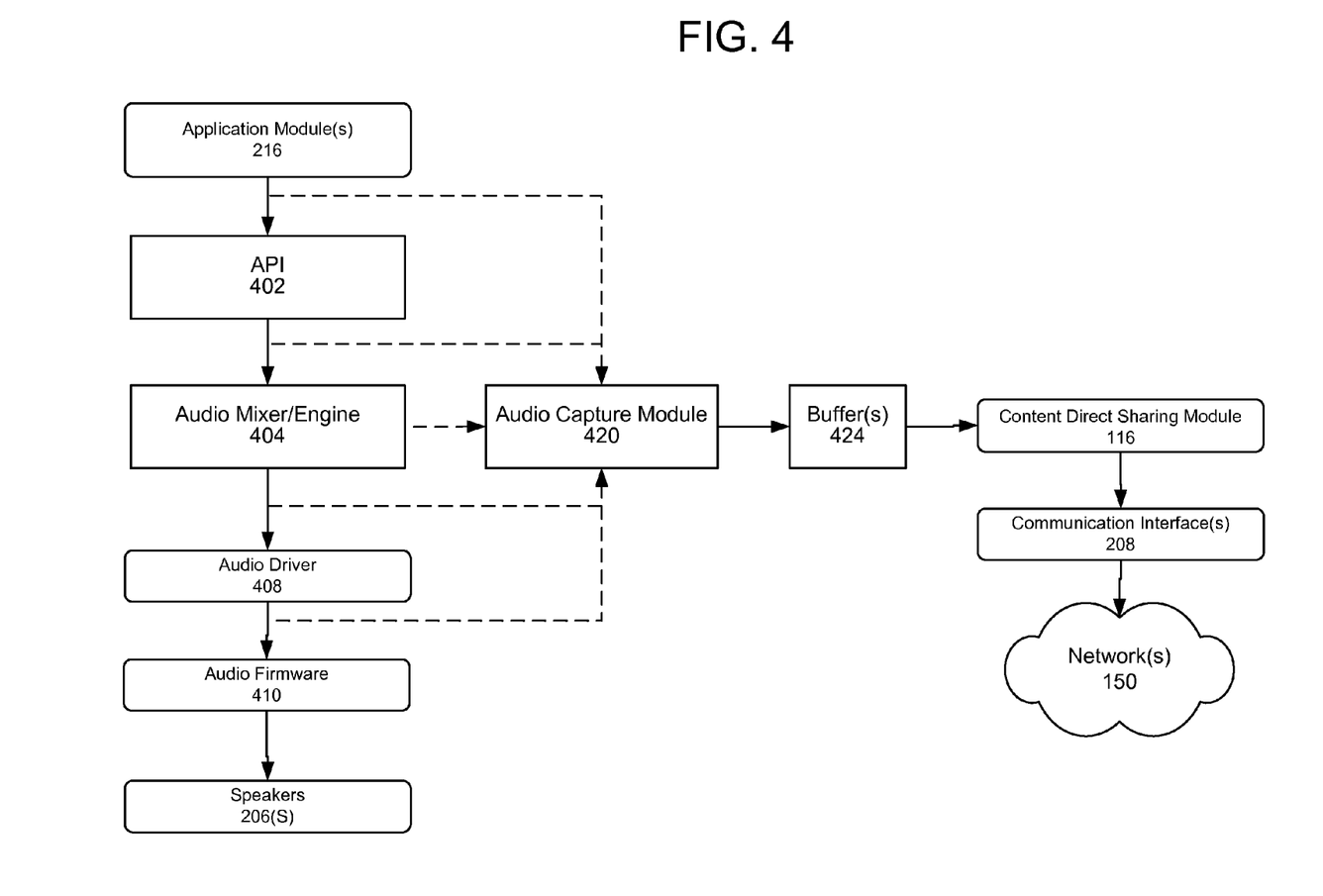
FIG. 4 illustrates capture of audio data for transmission and playback according to one aspect of the present disclosure.

A source media device may generate audio for sharing in a number of ways. FIG. 4 shows a system for processing audio in a media device. Audio data and audio commands are generated by an application module 216, such as a software application operating on a device. Those commands may include calls to an application programming interface for interfacing between the application module and lower level components, such as an audio mixer/engine 404. An application programming interface (API) is a set of functions or routines, executed in software and/or hardware, to specify how computing components should interact with each other. An API may be in the form of a library that includes specifications for routines, data structures, object classes, variables, etc. As used here, the API may include an instantiation of the API.

The application may send a call to the API that includes information about what audio should be output for the particular application (for example, during operation of the particular application). The API may then generate commands for the lower level components and/or may generate audio data corresponding to the audio for the application. Audio data from the API may be in a PCM (pulse code modulation) or non-PCM format. The API may generate component data segments, for example audio data segments corresponding to different channels of the audio that should be output for the application. Audio data and/or commands may be sent through an API 402 to an audio mixer/engine 404 which may mix the streams for passing to a kernel level audio driver 408. The audio driver 408 prepares the audio data on the kernel level for passing to the audio firmware 410 which configure the audio data for playback by the speaker(s) 206(S). Audio data may be captured by an audio capture module 420 for sending to a target media device at various points in this process.

Audio data from a particular application may be captured as output from the application module 216 or from the API 402. Audio objects including audio data and commands for execution by lower levels of the device may be captured for processing and sending to one or more target media devices. Capturing audio data from a particular application allows for detailed and customized routing of audio data, such as sending audio from one application to one media device and audio from another application to another media device. This differs from traditional audio sharing which typically mirrors the entire audio output of a source device to the target device. To capture audio at the application level and OS or other operational level interface may be configured to identify and capture audio data, such as audio objects, from the application module 216 or API 402.

In another aspect audio may be captured after the audio mixer/engine 404, or after the audio driver 408. By capturing audio at the kernel level, the capture process need not be dependent on particular OS level components or interfaces. This may allow for a more universally usable capture process rather than one that is configured for a particular OS.

The audio capture module 420 may capture audio data and process the audio data. For example, the audio capture module (or other module) may divide the audio into component data, such as data including audio intended for certain speakers of a multi-channel audio system, or the like. By separating the source audio into audio component data segments in this manner, different channels of audio may be sent to different devices. For example, audio for an individual channel may be sent directly to a speaker associated with that channel rather than all audio having to travel together to a receiver and then divided into channels and sent to individual speakers by the receiver. Current standards such as Bluetooth or Miracast are designed for sending audio to a single playback device where the audio is sent together rather than being divided into components. The present system may treat each audio channel as a discrete audio source that can be streamed to different target media devices.

As illustrated, audio processed by the audio capture module 420 may be sent as output from the application module(s) 216, API 402, audio mixer/engine 404, audio driver 408, or other component. The audio data may be divided into audio component data segments by the audio capture module 420 or may be already divided by the time the data is received by the audio capture module 420. For example, in one aspect, the audio signal may already be separated into component streams that may then be captured by the source media device at the appropriate level (such as through the API, at the driver, etc.) and then sent to one or more target media devices as audio component data. In another aspect, the source media device receives composite audio data (that is, audio data that is not separated into components), such as audio data generated by an application that does not necessarily have the ability to separate audio data into separate components. The source media device may then generate separate component data from the composite audio data. The separation may be based in part on capabilities of the one or more target media devices to which the eventual audio component data segments will be sent.

For example, an application may generate audio that includes audio output for different speaker channels, but as a composite stream of audio data. The source media device may be connected to a set of target media devices that will output audio in a 5:1 configuration, as selected by the user. The source media device may take the composite stream of audio data generated by the application and isolate the different audio for the different speaker channels. (If necessary, the source media device may also convert the audio channels of the application to operate with the target media devices, such as converting speaker audio to 5:1 audio, converting 7:1 audio to 5:1 audio, or the like.) In the example of the target 5:1 configuration, the isolated speaker channels may include five directional audio channels (center channel, front left channel, front right channel, rear left channel, and rear right channel) and one non-directional channel (such as for a subwoofer). The audio for the different channels may then be configured as separate audio component data segments for packetization and transmission to the set of target media devices.

For example, an AVR connected to the front three speakers may be sent the audio component data segments for the front three channels, a different AVR connected to the rear two speakers may be sent the audio component data segments for the rear two channels, and a still different device incorporated into a subwoofer may be sent the audio component data segment for the subwoofer. In still another example, if a user wishes to output certain audio component data on the source media device, and send other audio component data to target media devices, the system may accommodate such a setting. For example, a user may desire to output a center channel audio on the source device (such as a tablet while playing a movie or video game) while outputting the remaining channels of a 5:1 audio system to target media devices connected to various speakers. Using the present system, the center channel audio will be output by the source media device whereas the remaining channels will be sent as packetized audio component data for playback on various other speakers of the 5:1 audio system. As described elsewhere, the packetized audio component data may include timing information to coordinate audio playback to the user.

Figure 5:
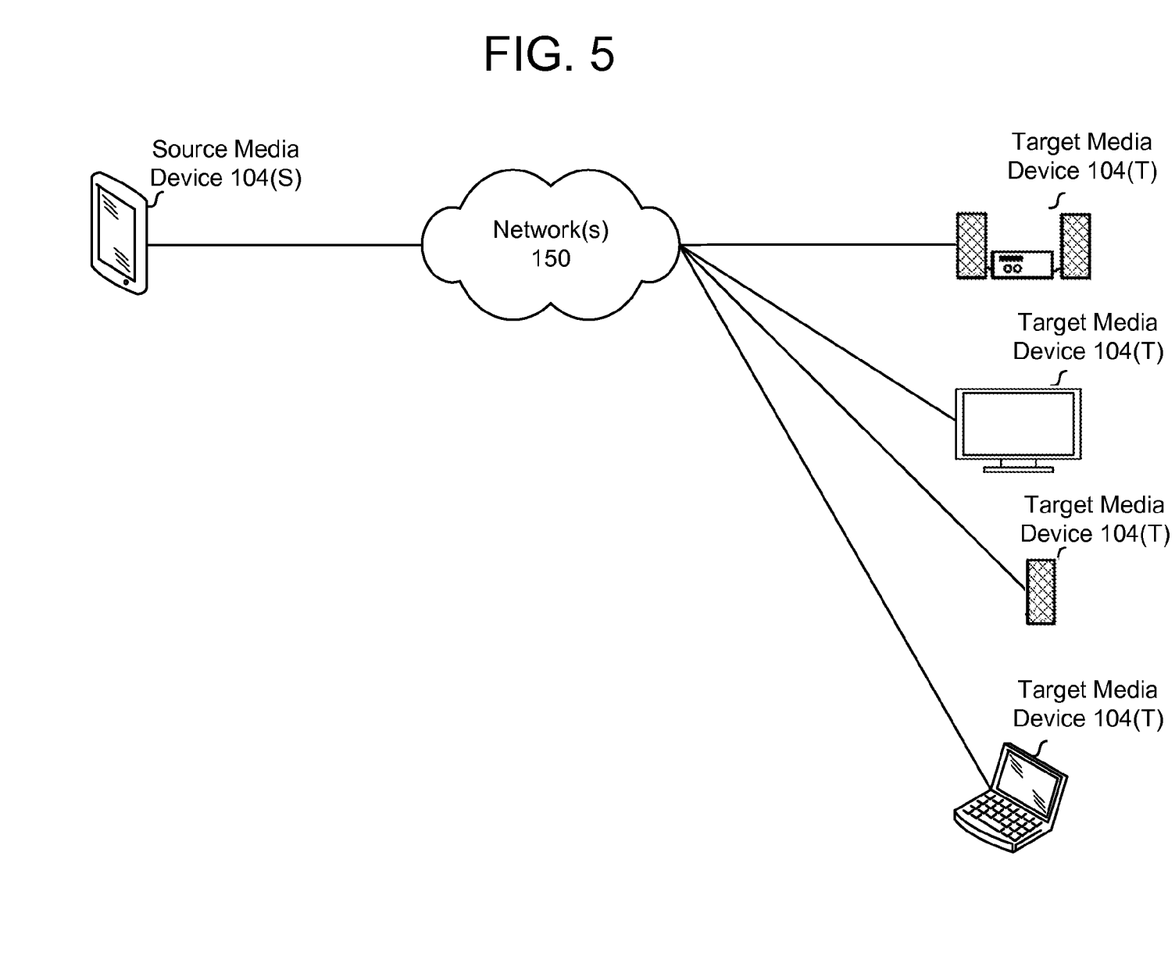
FIG. 5 illustrates audio sharing according to one aspect of the present disclosure.

Other configurations of creation/transmission of audio component are also possible. For example, a source media device may connect to multiple different target media devices including on 5:1 audio system, one separate subwoofer, one 7:1 audio system, and one single speaker including a tweeter and woofer. The source media device may create different audio component data streams for each desired audio playback and may then send those streams to the appropriate one or more target media devices. For example, in the above illustration, the same audio component data stream for subwoofer output may be sent to the 5:1 target audio system, the 7:1 target audio system and the target separate subwoofer device. For example, as shown in FIG. 5, a source media device 104(S) may send audio component data across the network 150 to multiple target media devices 104(T). The individual target devices may then process the audio component data for each respective audio output component of the target media devices 104(T), thereby sharing the audio of the source media device 104(S) among multiple targets. The division of audio from different source media devices and/or applications to different target media devices may be configured by a user, such as through a user interface on the source device.

Following processing by the audio capture module 420, audio data may be stored in one or more buffers 424. The buffer may also be located after the content direct sharing module 116, or may be in multiple locations based on the system configuration. The buffer allows for processing and storing of audio slightly ahead of transmission to give the system some flexibility with adjusting for latency and other factors. The buffer may be configured to send certain audio component data at different times, even if the different portions of audio component data are associated with a single audio output. This may be done to manage latency when different target media devices experience different communication conditions and different latencies. Buffers may exist on both source and target media devices to buffer audio that is to be transmitted as well as audio that is received.

For example, if a source audio device is sending three different streams of audio component data to three different target media devices, but the three streams of audio component data are to played back at the same time, the source media device may first send the stream of audio component data to the target media device that experiences the largest latency in order to coordinate arrival of the audio component data streams to their respective target devices. Other content besides audio, such as video, may also be buffered as described. In this manner the system may control the user's perceived latency by managing transmission of different content to reduce latency that is perceptible to the user during content playback. Thus if a particular target media device to which content is being sent experiences a 100 ms delay in receiving and processing content data from the source media device (and all other target media devices experience a shorter delay), the source media device may delay transmission of content to the other target media devices. Alternatively the source media device may instruct the other target media devices to hold content in their respective buffers before playback to allow the slowest target media device to receive and playback content to avoid user noticeable latency.

Prior to transmission, the audio data, such as the audio component data may be packetized. The packetization may be performed by the content direct sharing module 116 or by another module. Each packet may include a header with specific information for the particular packet. For example the packet may contain information regarding the packet size, source, and/or contents. The packet header may include timing information, such as timestamps from when the audio was captured, when the audio was transmitted and/or when the audio is scheduled to be played back. To coordinate playback, a source media device may synchronize its timing information with the target media device(s), for example in the initialization process discussed above. Various time management protocols may be used to exchange timing information and commands such as network time protocol (NTP), precision time protocol (PTP), or the like.

Audio may be compressed prior to sending (such as using a coding scheme such as AAC, mp3, or the like) or, if network conditions allow, the audio may be sent uncompressed to allow for greater sound quality. After processing (including packetization, compression, etc.) audio data may be sent to the communication interface 208 and then to the network 150 for transmission to the target media device.

Figure 6:
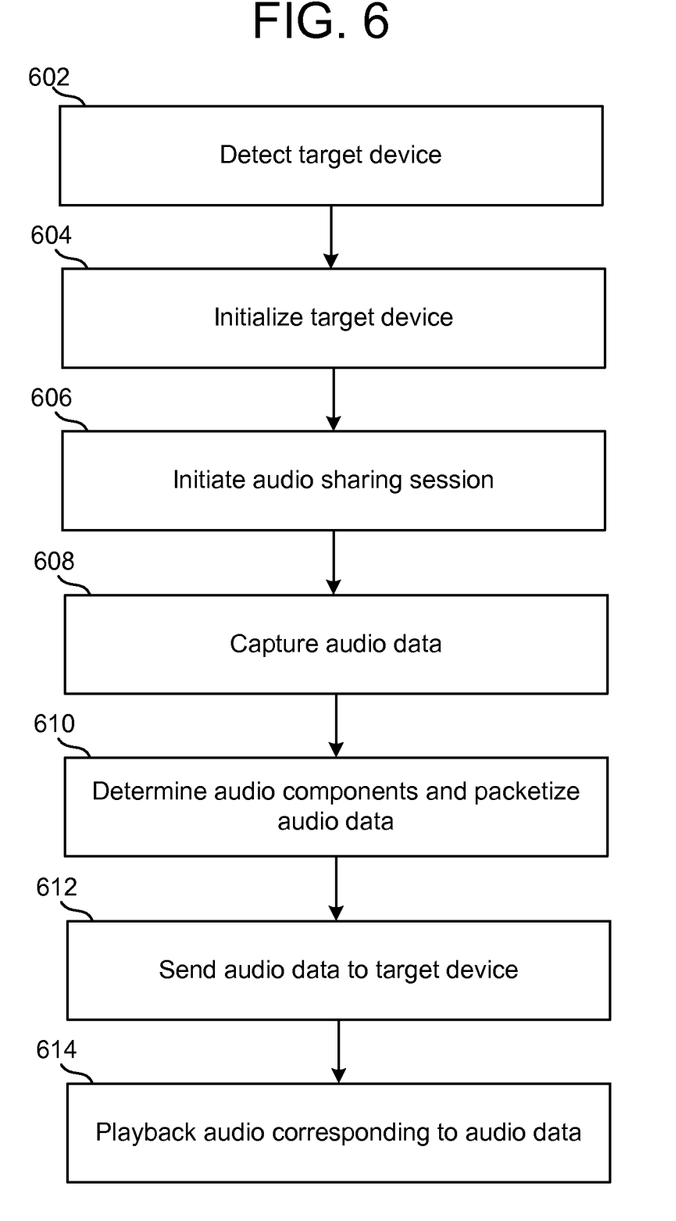
FIG. 6 illustrates audio sharing according to one aspect of the present disclosure.

FIG. 6 illustrates audio sharing operations as performed by a source device according to one aspect of the present disclosure. A source media device 104(S) may detect a target device, as shown in block 602. The source media device 104(S) may then initialize the target device, as shown in block 604. The initialization may comprise exchanging configuration information with the target device as described above. The source media device 104(S) may then initiate an audio sharing session with the target device, as shown in block 606. The source media device 104(S) may then capture audio data, as shown in block 608. The captured audio data may be associated with an application operating on the source media device. The source media device 104(S) may then determine audio components and packetize the audio data, as shown in block 610. The audio data captured in step 608 may already divided into components or the source media device 104(S) may divide the audio into components prior to packetizing and sending to a target media device 104(T). processing may include dividing the audio data into different audio component data segments, where each segment is associated with an audio channel of the original audio data. The source media device 104(S) may then send the processed and packetized audio data to the target device, as shown in block 612. If applicable, the source media device may also playback its own respective selected audio corresponding to the audio data, as shown in block 614.

Figure 7:
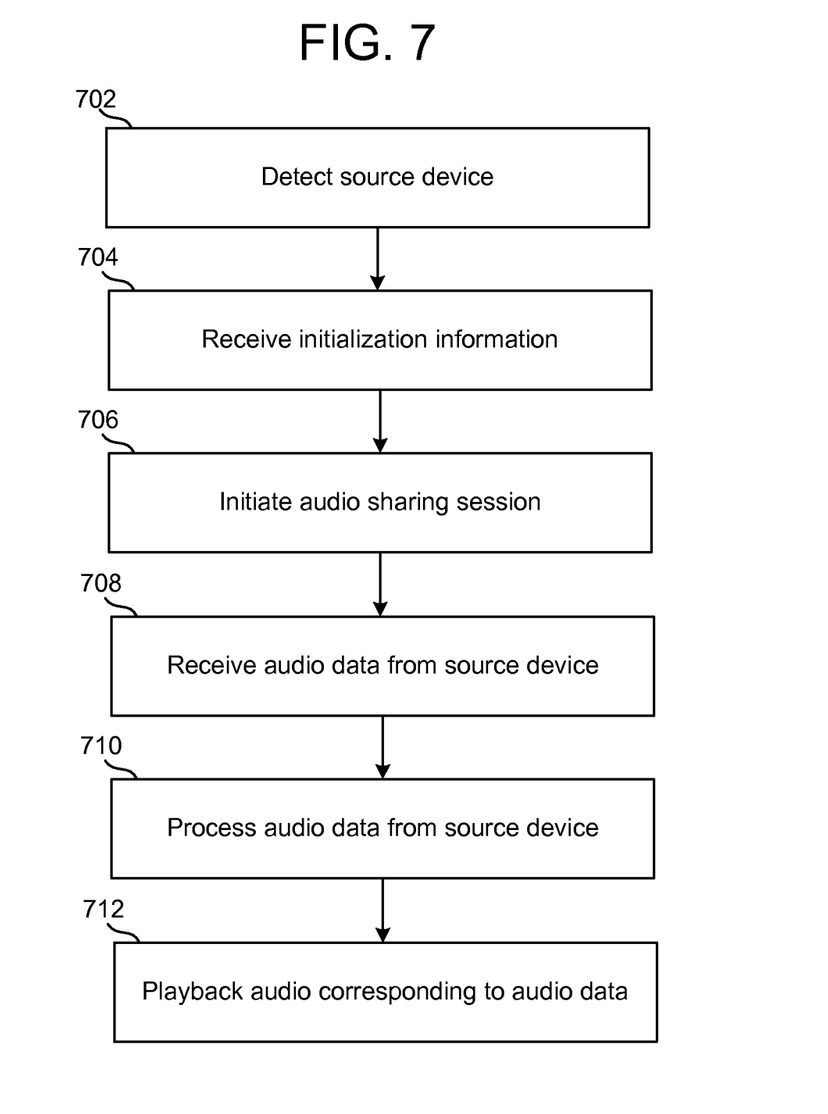
FIG. 7 illustrates audio sharing according to one aspect of the present disclosure.

FIG. 7 illustrates audio sharing operations as performed by a target device according to one aspect of the present disclosure. A target media device 104(T) may detect a source device, as shown in block 702. The target media device 104(T) may receive initialization information, as shown in block 704. The target media device 104(T) may also send its own configuration information to the target media device 104(T), not shown. The target media device 104(T) may then initiate a display sharing session, as shown in block 706. The display sharing session may be initiated in response to an instruction to do so from the source device. The target media device 104(T) may receive audio data from the source device, as shown in block 708. The target media device 104(T) may process the audio data, as shown in block 710. The processing may include de-packetizing the received audio data, decoding the audio data, and/or other processing. The target media device 104(T) may play back the audio data, as shown in block 712. Component audio data segments received in the audio data may be assigned to their respective outputs, such as certain audio data components for certain channels being sent to the appropriate channel speaker associated with the target media device 104(T). To coordinate output of component audio data segments that are to be output at the same time, playback of individual component audio data segments may be timed according to timing information received with the audio data, such as in a packet header or other command.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method for wirelessly playing audio from a mobile device on a remote audio output device, the method comprising:
   sending mobile device configuration information to the remote audio output device;
   receiving remote device configuration information from the remote audio output device, the remote device configuration information comprising information about audio output capabilities of the remote audio output device;
   operating an application;
   generating, by the application, a call to an application programming interface, the call comprising audio data corresponding to audio to be output during operation of the application;
   determining, by the application programming interface, a plurality of audio component data segments from the audio data, the plurality of audio component data segments including:
      a center channel audio component data segment corresponding to a center channel of the audio data, and
      at least one side channel audio component data segment corresponding to at least one side channel of the audio data;
   sending the at least one side channel audio component data segment to the remote audio output device;
   sending timing information to the remote audio output device, the timing information including a time for playback of the at least one side channel audio component data segment; and
   playing audio on a speaker of the mobile device at the time for playback, the audio corresponding to the center channel audio component data segment.

2. The method of claim 1, wherein the plurality of audio component data segments further includes a rear channel audio component data segment corresponding to a rear channel of the audio data, and wherein the method further comprises:
   sending the rear channel audio component data segment to a second remote audio output device; and
   sending timing information to the second remote audio output device, the timing information including a time for playback of the rear channel audio component data segment, wherein the time for playback of the rear channel audio component data segment is the same as the time for playback of the center channel audio component data segment and the at least one side channel audio component data segment.

3. The method of claim 1, wherein the remote device configuration information comprises latency data, the latency data describing a time for audio data to be received and played back by the remote audio output device, and wherein the method further comprises configuring the time for playback based on the latency data.

4. A computing device, comprising:
at least one processor;
a memory device including instructions operable to be executed by the at least one processor to perform a set of actions, configuring the at least one processor to:
operate an application;
determine audio data corresponding to audio to be output, the audio associated with the application;
determine, by an application programming interface or an application module configured to call the application programming interface, a plurality of audio component data segments based on the audio data, each of the plurality of audio component data segments corresponding to a same playback time; and
send a first audio component data segment of the plurality of audio component data segments to a second device.

5. The computing device of claim 4, wherein the at least one processor is further configured to:
send the first audio component data segment of the plurality of audio component data segments to a third device; and
send the timing information to the third device.

6. The computing device of claim 4, wherein the at least one processor is further configured to:
send a second audio component data segment of the plurality of audio component data segments to a third device; and
send the timing information to the third device.

7. The computing device of claim 4, further comprising an audio output component, and wherein the at least one processor is further configured to output audio through the audio output component at the playback time, the output audio corresponding to a second audio component data segment of the plurality of audio component data segments.

8. The computing device of claim 7, wherein the at least one processor is further configured to:
receive latency information from the second device; and
configure the playback time based on the latency information.

9. The computing device of claim 4, wherein each of the plurality of audio component data segments corresponds to a different channel of the audio.

10. The computing device of claim 4, wherein the at least one processor is further configured to:
receive configuration information from the second device, the configuration information comprising information regarding audio playback capabilities of the second device; and
to send the first audio component data segment at a transmission time based on the configuration information, wherein the playback time is based on the configuration information.

11. The computing device of claim 4, wherein the at least one processor is further configured to:
operate a second application;
determine second audio data corresponding to second audio to be output, the second audio associated with the second application;
determine a second plurality of audio component data segments based on the second audio data, each of the second plurality of audio component data segments corresponding to a second playback time;
send an audio component data segment of the second plurality of audio component data segments to a third device; and
send second timing information to the third device, the second timing information based at least in part on the second playback time.

12. The computing device of claim 4, wherein the at least one processor is further configured to send timing information to the second device, the timing information based at least in part on the playback time.

13. A non-transitory computer-readable storage medium storing processor-executable instructions for controlling a computing device, comprising program code to:
operate an application;
determine audio data corresponding to audio to be output, the audio associated with the application;
determine, by an application programming interface or an application module configured to call the application programming interface, a plurality of audio component data segments based on the audio data, each of the plurality of audio component data segments corresponding to a same playback time; and
send a first audio component data segment of the plurality of audio component data segments to a second device.

14. The non-transitory computer-readable storage medium of claim 13, further comprising program code to:
send the first audio component data segment of the plurality of audio component data segments to a third device; and
send the timing information to the third device.

15. The non-transitory computer-readable storage medium of claim 13, further comprising program code to:
send a second audio component data segment of the plurality of audio component data segments to a third device; and
send the timing information to the third device.

16. The non-transitory computer-readable storage medium of claim 13, further comprising program code to output audio through an audio output component at the playback time, the output audio corresponding to a second audio component data segment of the plurality of audio component data segments.

17. The non-transitory computer-readable storage medium of claim 16, further comprising program code to:
receive latency information from the second device; and
configure the playback time based on the latency information.

18. The non-transitory computer-readable storage medium of claim 13, wherein each of the plurality of audio component data segments corresponds to a different channel of the audio.

19. The non-transitory computer-readable storage medium of claim 13, further comprising program code to:
receive configuration information from the second device, the configuration information comprising information regarding audio playback capabilities of the second device; and
send the first audio component data segment at a transmission time based on the configuration information, wherein the playback time is based on the configuration information.

20. The non-transitory computer-readable storage medium of claim 13, further comprising program code to:
operate a second application;
determine second audio data corresponding to second audio to be output, the second audio associated with the second application;

determine a second plurality of audio component data segments based on the second audio data, each of the second plurality of audio component data segments corresponding to a second playback time;

send an audio component data segment of the second plurality of audio component data segments to a third device; and send second timing information to the third device, the second timing information based at least in part on the second playback time.

21. The non-transitory computer-readable storage medium of claim 13, further comprising program code to send timing information to the second device, the timing information based at least in part on the playback time.

* * * * *